US012625548B2

(12) United States Patent
Gosch et al.

(10) Patent No.: US 12,625,548 B2
(45) Date of Patent: May 12, 2026

(54) EYE TRACKING LOSS MITIGATIONS

(71) Applicant: Apple Inc., Cupertino, CA (US)

(72) Inventors: Christian W Gosch, Campbell, CA (US); Riley C Borgard, San Francisco, CA (US); Sheila M Santos, San Francisco, CA (US); Ritesh Gangadhar Sholapur, Sunnyvale, CA (US); Sabine Webel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/676,387

(22) Filed: May 28, 2024

(65) Prior Publication Data

US 2024/0402799 A1    Dec. 5, 2024

Related U.S. Application Data

(60) Provisional application No. 63/470,504, filed on Jun. 2, 2023.

(51) Int. Cl.
  *G06F 3/01*        (2006.01)
  *G06T 7/73*        (2017.01)
(52) U.S. Cl.
  CPC ................ *G06F 3/013* (2013.01); *G06T 7/73* (2017.01); *G06T 2207/10048* (2013.01); *G06T 2207/30201* (2013.01)
(58) Field of Classification Search
  CPC . G06F 3/013; G06T 7/70; G06T 2207/10048; G06T 7/73
  See application file for complete search history.

(56) References Cited

U.S. PATENT DOCUMENTS

| | | | | |
|---|---|---|---|---|
| 2019/0099075 A1* | 4/2019 | Gavas | .................. | A61B 5/7257 |
| 2022/0197381 A1 | 6/2022 | Young et al. | | |
| 2022/0353431 A1* | 11/2022 | Inagaki | ............... | H04N 23/611 |
| 2023/0210442 A1* | 7/2023 | Krueger | .............. | A61B 5/6803 |
| | | | | 600/301 |

FOREIGN PATENT DOCUMENTS

WO    WO 2007145566    12/2007

* cited by examiner

*Primary Examiner* — Matthew A Eason
*Assistant Examiner* — Scott D Au
(74) *Attorney, Agent, or Firm* — Thompson Hine LLP

(57) ABSTRACT

Various implementations disclosed herein include devices, systems, and methods that mitigate eye tracking loss. For example, a process may capture sensor data of a 3D region. The process may further generate eye tracking data comprising a 3D position of an eye based on tracking the 3D position of the eye. The 3D position may be updated over time based on the captured sensor data. The process may further detect a condition interfering with updating the 3D position of the eye based on the captured sensor data. The process may further update the eye tracking data using a smoothed 3D position of the eye. The smoothed 3D position may be determined based on previously-tracked 3D positions of the portion of the eye and a current 3D position of the portion of the eye determined based on current sensor data.

19 Claims, 5 Drawing Sheets

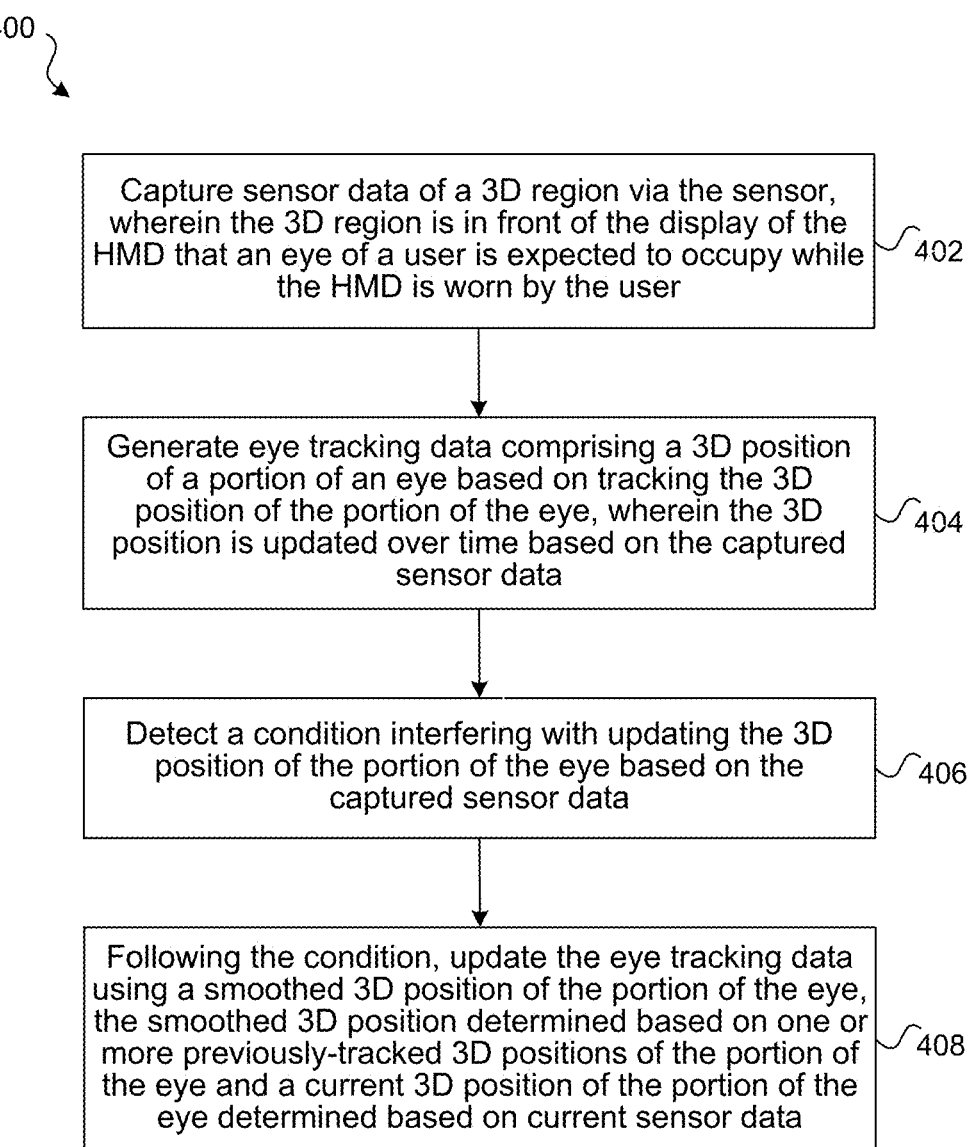

400

Capture sensor data of a 3D region via the sensor, wherein the 3D region is in front of the display of the HMD that an eye of a user is expected to occupy while the HMD is worn by the user        402

Generate eye tracking data comprising a 3D position of a portion of an eye based on tracking the 3D position of the portion of the eye, wherein the 3D position is updated over time based on the captured sensor data        404

Detect a condition interfering with updating the 3D position of the portion of the eye based on the captured sensor data        406

Following the condition, update the eye tracking data using a smoothed 3D position of the portion of the eye, the smoothed 3D position determined based on one or more previously-tracked 3D positions of the portion of the eye and a current 3D position of the portion of the eye determined based on current sensor data        408

FIG. 4

Device 500

CPU(s)
502

I/O Device(s) &
Sensor(s)
506

Comm.
Interface(s)
508

Programming
Interface(s)
510

Output
Device(s)
512

Image Sensor
System(s)
514

504

Memory 520

Operating System 530

Instruction Set(s) 540

Eye Tracking Data Generation
Instruction Set(s) 542

Eye Tracking Data Update Instruction
Set(s) 544

EYE TRACKING LOSS MITIGATIONS

CROSS-REFERENCE TO RELATED APPLICATIONS

This application claims the benefit of U.S. Provisional Application Ser. No. 63/470,504 filed Jun. 2, 2023, which is incorporated herein in its entirety.

TECHNICAL FIELD

The present disclosure generally relates to systems, methods, and devices that provide eye tracking based on sensor data during periods during which sensor data is not continuously available, e.g., periods during which eye tracking loss events occur.

BACKGROUND

Existing eye tracking techniques are used for various applications. For example, devices configure how content is displayed based on eye tracking and/or may determine responses to user eye activity based on eye tracking. Existing eye tracking techniques may not adequately account for periods during which sensor data is not continuously available, e.g., periods during which an image or other sensor data corresponding to the eye's current location and/or orientation are unavailable or insufficiently accurate or precise.

SUMMARY

Various implementations disclosed herein include devices, systems, and methods that mitigate a temporary eye tracking loss. A temporary eye tracking loss may be caused by, inter alia, a user blinking or a fast eye motion. There may be a sudden jump between a last tracked eye position before an eye tracking loss event and the next acquired eye position determined subsequent to the eye tracking loss event. In use cases in which content display is based on the eye tracking, the temporary eye tracking loss and/or associated jumps may result in display adjustments that result in visual anomalies, e.g., content items appearing to jump from one place to another.

Various implementations avoid such sudden jumps and/or provide other benefits by providing a temporal smoothing of a three-dimensional (3D) position of a tracked portion of an eye (e.g., a pupil). The temporal smoothing of the 3D position may provide a lazy follow effect (with respect to the 3D position of the portion of the eye) implemented until a 3D smoothed position reaches a latest measured location.

A smoothing process may be performed with respect to a transition rate that is dependent on a confidence level with respect to a current eye position measurement. The confidence level may be dependent on a pupil location within an eye box. An eye box may comprise a 3D region located in front of a display of a head mounted device (HMD). The 3D region may comprise a region that an eye is expected to occupy while the HMD is being worn by a user. In some implementations, the confidence level may decrease as a function of an angular distance. In some implementations, hysteresis may be applied based on a threshold angular distance with respect to the angular distance.

In some implementations, an HMD device has a processor (e.g., one or more processors) that executes instructions stored in a non-transitory computer-readable medium to perform a method. The method performs one or more steps or processes. In some implementations, the HMD captures sensor data of a 3D region via a sensor of the HMD. The 3D region is in front of a display of the HMD that an eye of a user is expected to occupy while the HMD is worn by the user. In some implementations, eye tracking data is generated. The eye tracking data may include a 3D position of a portion of an eye based on tracking the 3D position of the portion of the eye. The 3D position may be updated over time based on the captured sensor data. In some implementations, a condition interfering with updating the 3D position of the portion of the eye is detected based on the captured sensor data. In some implementations, following the condition, the eye tracking data is updated using a smoothed 3D position of the portion of the eye. The smoothed 3D position may be determined based on one or more previously-tracked 3D positions of the portion of the eye and a current 3D position of the portion of the eye determined based on current sensor data.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart illustrating an exemplary method that provides smooth transitions for eye tracking loss with respect to display apparatuses that depend on eye tracking data, in accordance with some implementations.

Figure 1:
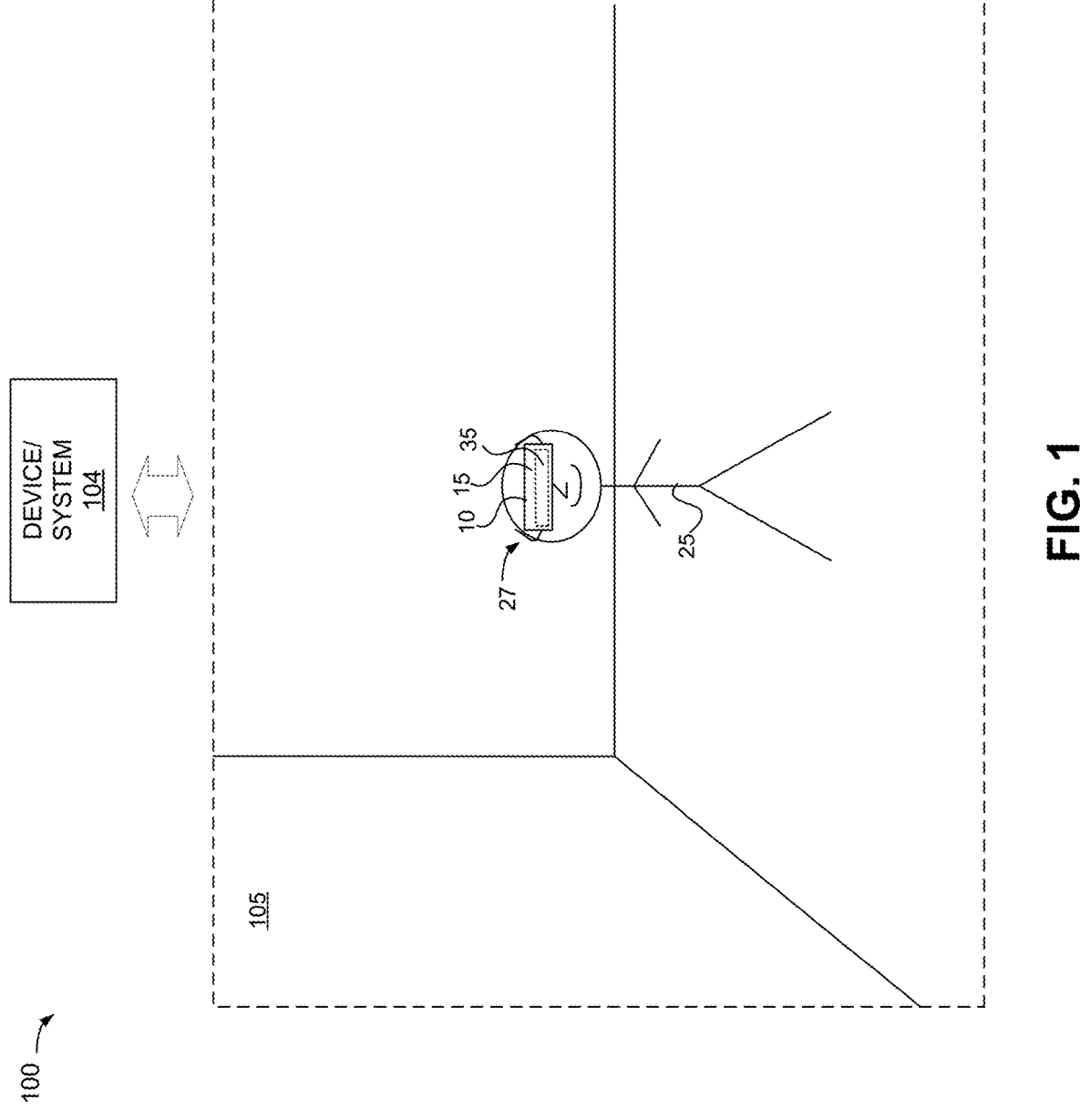
FIG. 1 illustrates an example environment of a real-world environment including a device with a display, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 105 (e.g., a room) including a device 10 (e.g., an HMD) with a display 15. Additionally, example environment 100 includes a device/system 104 (e.g., a server, an intermediary device, etc.) in communication with device 10. In some implementations, the device 10 displays content to a user 25.

The device 10 may obtain image data, motion data, and/or physiological data (e.g., eye tracking/pupillary data, etc.) from the user 25 via one or more sensors (e.g., sensors 35 such as, inter alia, inward facing cameras). For example, the device 10 may include a light source (e.g., a light-emitting diode (LED) that may be used to illuminate specular and diffusive parts of an eye(s) 27 of the user 25 via light rays (e.g., infrared (IR) light). Based on the specular illumination of the eye(s) 27, the device 10 may obtain eye gaze characteristic data via a high-power sensor, such as a high power complementary metal oxide semiconductor (CMOS) sensor. Additionally, or alternatively, the device 10 may obtain eye gaze characteristic data via a low-power sensor, such as a photodiode.

While this example and other examples discussed herein illustrate a single device 10 in a real-world environment 105, the techniques disclosed herein are applicable to multiple devices as well as to other real-world environments. For example, the functions of device 10 may be performed by multiple devices, with a high-power sensor, a low-power sensor, and a light source on each respective device, or divided among them in any combination.

In some implementations, as illustrated in FIG. 1, the device 10 is a wearable device such as a head-mounted device (HMD).

In some implementations, the device 10 includes an eye-tracking system for detecting eye position and eye movements (of eye(s) 27) via eye gaze characteristic data. For example, an eye-tracking system may include one or more IR LEDs, an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate eye(s) 27 of the user 25 and the NIR camera may capture images of the eye(s) 27 of the user 25. In some implementations, images captured by the eye-tracking system may be analyzed to detect position and movements of the eye(s) 27 of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on a display 15 of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, one or both of eye(s) 27 of the user 25, including one or both pupils of the user 25 may present physiological data in the form of a pupillary response (e.g., eye characteristic data) detected from a glint analysis. The pupillary response of the user 25 may result in a varying of the size or diameter of a pupil, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

In some implementations, the device 10 mitigates eye tracking loss due to temporary interruptions with respect to eye tracking processes. For example, when a user (e.g., user 25) blinks, eye tracking may be temporarily disabled. During the blink, the user's eye(s) may move without being tracked thereby resulting in a sudden jump between a last known eye position (prior to the blink) and a next acquired eye position (subsequent to the blink). The sudden jump in eye positions may create issues when the device 10 performs display compensations (e.g., lens distortion correction, applying corrections for chromatic aberration (i.e., color fringing), foveation, etc.) based on detected pupil location or gaze as a sudden visual transformation of content may occur (e.g., content may appear to jump to a different position). For example, if a user is viewing content via an HMD and blinks or briefly closes their eye(s), a pupil position may change while their eye(s) is closed. Subsequently, when the user opens their eye(s) the pupil position may change and the content may appear to jump such that the content changes location quickly.

Therefore, a temporal smoothing of pupil coordinates may be applied (to allow the pupil coordinate to catch up to a current position and correct the content jump), such that a lazy follow effect is enabled until a smoothed pupil coordinate reaches a latest measured location of a pupil. For example, the tracked position of the pupil may slowly catch up to the measured position over a series of times/frames:

| Frame/Time | Measure Position | Tracked Position |
|---|---|---|
| 1 | 0, 0, 0 | 0, 0, 0 |
| | INTERRUPTION | |
| 5 | 5, 5, 5 | 2, 2, 2 |
| 6 | 6, 6, 6 | 4, 4, 4 |
| 7 | 7, 7, 7 | 6, 6, 6 |
| 8 | 7, 7, 7 | 7, 7, 7 |
| 9 | 8, 8, 8 | 8, 8, 8 |

In the example above, the tracked position during frame/times 5, 6, 7 is not set to the measured position. This avoids having a large jump in position between frame/time 1 and frame/time 5. Rather the tracked position at frame/time 5 is based on the prior position (e.g., the tracked position at frame/time 1) and current data (e.g., the measured position at frame/time 5). The tracked position at frame/time 6 is based on the prior position (e.g., the tracked position at frame/time 5) and current data (e.g., the measured position at frame/time 6). The tracked position at frame/time 7 is based on the prior position (e.g., the tracked position at frame/time 6) and current data (e.g., the measured position at frame/time 7). The tracked position is thus smoothed over time. This example illustrates one exemplary smoothing process. Various other smoothing parameters and techniques may be used.

In some implementations, the temporal smoothing process may be performed based on a transition rate (i.e., a rate of travel from the smoothed pupil coordinate to the latest measured location of a pupil) dependent on a confidence level of a current eye position measurement detection. The confidence level may be dependent on a pupil location within an eye box. An eye box comprises a 3D region located in front of a display (e.g., 15) of an HMD (e.g., device 10) that an eye is expected to occupy during HMD usage. The confidence level may decrease as a function of an angular distance of a gaze direction. Likewise, a hysteresis may be applied with respect to a threshold angular distance thereby decreasing jitter as an eye tracking struggles to lock on to current pupil coordinates.

Figure 2:
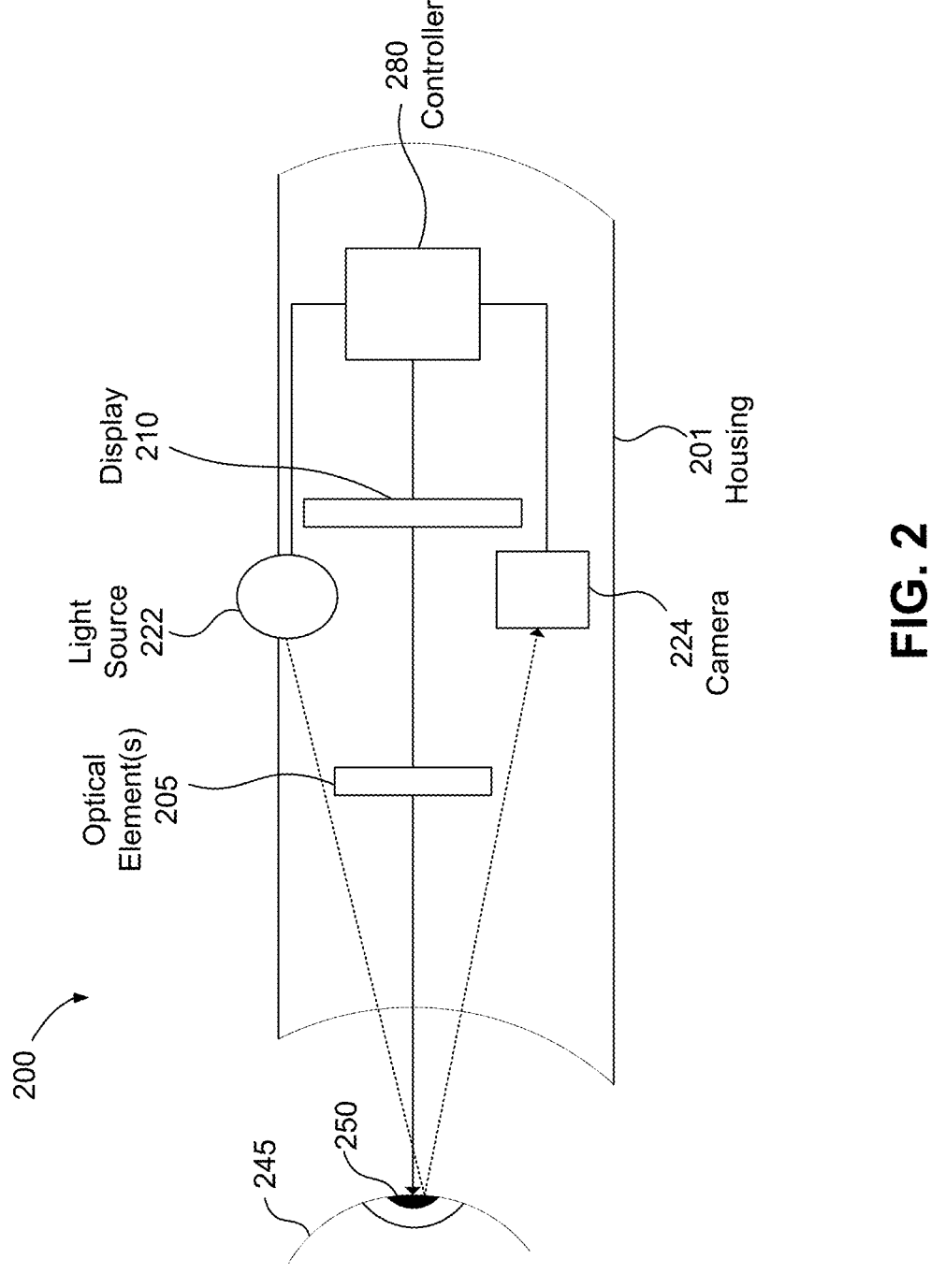
FIG. 2 illustrates a block diagram of an exemplary head-mounted device, in accordance with some implementations.

FIG. 2 illustrates a block diagram of an exemplary head-mounted device 200, in accordance with some implementations. The head-mounted device 200 includes a housing 201 (or enclosure) that houses various components of the head-mounted device 200. The housing 201 includes (or is coupled to) an eye pad (not shown) disposed at a proximal (to the user 25) end of the housing 201. In various implementations, the eye pad is a plastic or rubber piece that comfortably and snugly keeps the head-mounted device 200 in the proper position on the face of the user 25 (e.g., surrounding the eye 245 of the user 25).

The housing 201 houses a display 210 that displays an image, emitting light towards or onto the eye 245 of a user 25. In various implementations, the display 210 emits the light through an eyepiece having one or more optical elements 205 that refracts the light emitted by the display 210, making the display appear to the user 25 to be at a virtual distance farther than the actual distance from the eye to the display 210. For example, optical element(s) 205 may include one or more lenses, a waveguide, other diffraction optical elements (DOE), and the like. For the user 25 to be able to focus on the display 210, in various implementations, the virtual distance is at least greater than a minimum focal distance of the eye 245 (e.g., 6 cm). Further, in order to provide a better user experience, in various implementations, the virtual distance is greater than 1 meter.

The housing 201 also houses a tracking system including one or more light sources 222, camera 224, and a controller 280. The one or more light sources 222 emit light onto the eye 245 (e.g., a pupil 250) of the user 25 that reflects as a light pattern (e.g., a circle of glints) that can be detected by the camera 224. Based on the light pattern, the controller 280 can determine an eye tracking characteristic of the user 25. For example, the controller 280 can determine a gaze direction and/or a blinking state (eyes open or eyes closed) or fast eye motion of the user 25. As another example, the controller 280 can determine a pupil center (of pupil 250), a pupil size (of pupil 250), or a point of regard. Thus, in various implementations, the light is emitted by the one or more light sources 222, reflects off the eye 245 (e.g., pupil 250) of the user 25, and is detected by the camera 224. In various implementations, the light from the eye 245 (pupil 245) of the user 25 is reflected off a hot mirror or passed through an eyepiece before reaching the camera 1024.

The display 210 emits light in a first wavelength range and the one or more light sources 222 emit light in a second wavelength range. Similarly, the camera 224 detects light in the second wavelength range. In various implementations, the first wavelength range is a visible wavelength range (e.g., a wavelength range within the visible spectrum of approximately 400-800 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 210 by looking at it), provide foveated rendering (e.g., present a higher resolution in an area of the display 210 the user 25 is looking at and a lower resolution elsewhere on the display 210), or correct distortions (e.g., for images to be provided on the display 210).

In various implementations, the one or more light sources 222 emit light towards the eye 245 (e.g., pupil 250) of the user 25 which reflects in the form of a plurality of glints.

In various implementations, the camera 224 is a frame/shutter-based camera that, at a particular point in time or multiple points in time at a frame rate, generates an image of the eye 245 of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 224 is an event camera including a plurality of light sensors (e.g., a matrix of light sensors) at a plurality of respective locations that, in response to a particular light sensor detecting a change in intensity of light, generates an event message indicating a particular location of the particular light sensor.

Figure 3:
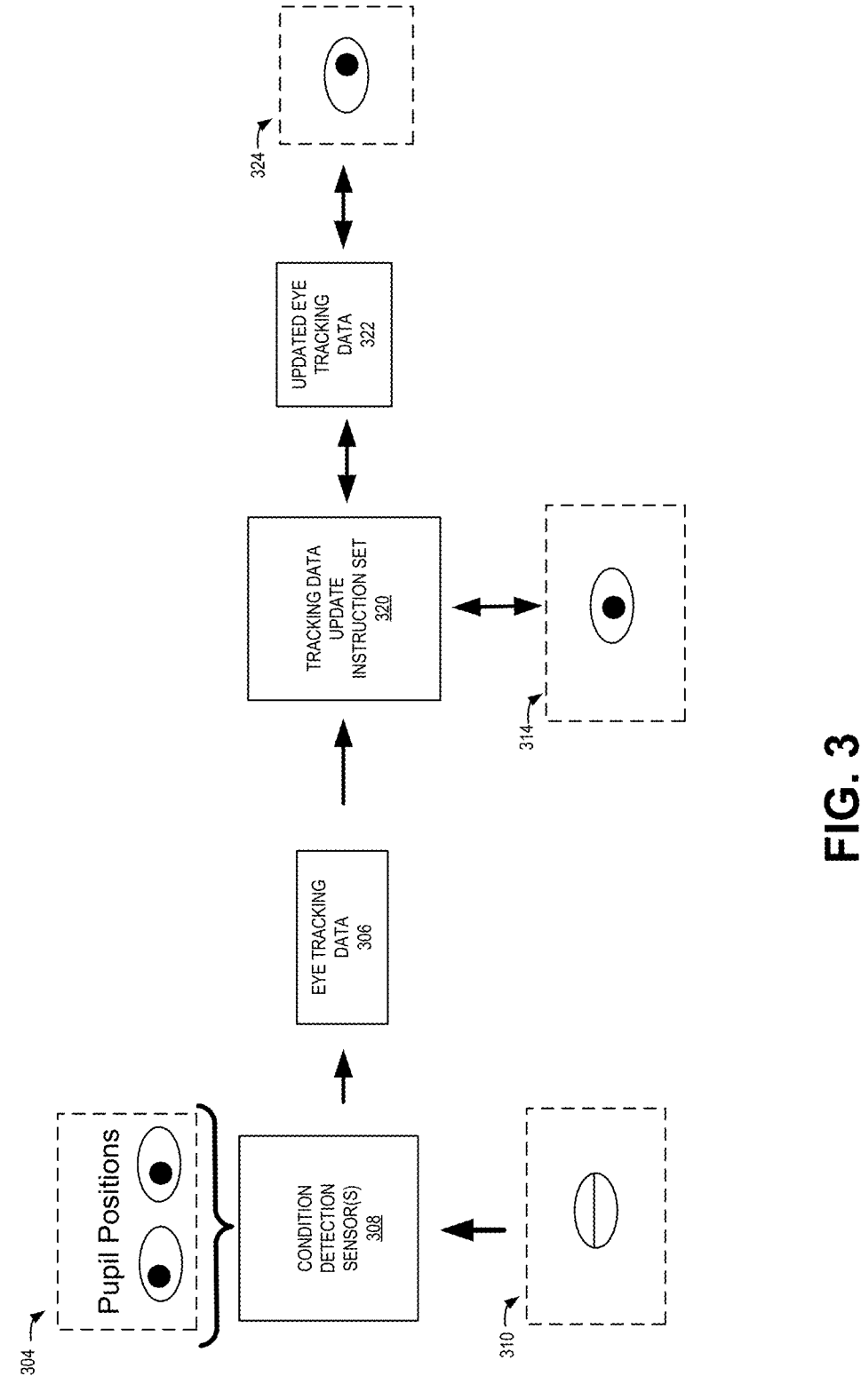
FIG. 3 illustrates a system flow diagram of an example environment in which a system mitigates eye tracking loss that may result in a sudden jump between a last known eye position and a next acquired eye position, in accordance with some implementations.

FIG. 3 illustrates a system flow diagram of an example environment 300 in which a system mitigates eye tracking loss (e.g., due to: a user blink, a fast eye motion, moving out of range of an eye tracking sensor, an alternative event producing sensor data that does not reflect the accurate position of the eye portion, etc.) that may result in a sudden jump between a last known eye position and a next acquired eye position, in accordance with some implementations. For example, if a gaze loss is detected due to a user blink, a last known pupil position may be frozen (e.g., locked). Subsequently, when a next pupil position is detected (following the blink), a temporal smoothing of the pupil positions is enabled such that a slow movement towards the current pupil position is initiated with respect to an interpolation towards the current pupil position to mitigate movements that are too abrupt thereby creating visual artifacts caused by abrupt changes to pupil position.

In an example implementation, the environment 300 includes condition detection sensors 308 (e.g., inward facing cameras of an HMD) capturing sensor data (with respect to a 3D region such as an eye box) representing an eye(s) of a user. The 3D region (e.g., eye box) may be located in front of a display of the HMD such that an eye of a user would be expected to occupy this 3D space during HMD usage. For example, the environment 300 may include a glint detection system configured to generate an infrared (IR) glint pattern that reflects off a surface of an eye. Subsequently, condition detection sensors 308 are configured to detect the glint pattern reflections (e.g., capturing images of the glint pattern reflections). In response, eye tracking data 306 is generated. The eye tracking data 306 may include a 3D position(s) of a portion of an eye (e.g., pupil positions 304) based on tracking the 3D position(s). The 3D position is continuously updated with respect to the sensor data being captured. The 3D position(s) of eye portions (e.g., pupils) may be determined based on the captured images of the glint pattern reflections.

The condition detection sensors 308 may additionally detect a loss in eye tracking due to a sensor data interruption. For example, condition detection sensors 308 may detect that an eye of the user has closed (e.g., due to a blink) causing an eye tracking interruption condition 310 with respect to the eye tracking data 306. In response to the loss in eye tracking, a tracking data update instruction set 320 may be executed to generate updated eye tracking data 322 using a temporally smoothed 3D position 314 of the portion of the eye (e.g., a pupil). The temporally smoothed 3D position 314 may be determined based on previously tracked 3D positions of the portion of the eye (e.g., using last tracked 3D position(s) such as pupil positions 304) and a currently tracked 3D position 324 of the portion of the eye determined based on currently detected sensor data. For example, the temporally smoothed 3D position 314 may be configured to gradually migrate (e.g., catch up) towards the currently tracked 3D position 324. A rate of migration may be determined with respect to a confidence level of the current tracking data that may be dependent on a pupil position within the 3D region.

FIG. 4 is a flowchart representation of an exemplary method 400 that mitigates eye tracking loss due to an eye tracking data interruption that results in a sudden jump between a last known eye position and the next acquired eye position, in accordance with some implementations. In some implementations, the method 400 is performed by a device, such as a mobile device an HMD, a server/intermediary device, etc. In some implementations, the device has a screen for displaying images and/or a screen for viewing stereoscopic images such as a head-mounted display (HMD such as e.g., device 10 of FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory). Each of the blocks in the method 400 may be enabled and executed in any order.

At block 402, the method 400 captures sensor data of a 3D region (e.g., an eye box) via a sensor(s) such as, inter alia, inward facing cameras of an HMD. The 3D region may be configured to be located in front of a display of an HMD such that an eye of a user would be expected to occupy the 3D space during HMD usage. In some implementations, a glint-based system may generate an IR glint pattern that reflects off the surface of the eye and a sensor may be configured to detect the reflection pattern.

At block 404, the method 400 generates eye tracking data that includes a 3D position of a portion of an eye (e.g., a pupil) based on tracking the 3D position of the portion of the eye. In some implementations, the 3D position may be updated over time based on the captured sensor data. In some implementations, determining the 3D position of the eye (e.g., pupil or other portion of the eye) may be based on detecting a glint pattern within image data.

At block 406, the method 400 detects a condition interfering with updating the 3D position of the portion of the eye based on the captured sensor data. The condition interfering with updating the 3D position may include, inter alia, a blinking motion, a rapid eye motion, moving out of range of an eye tracking sensor, any type of event that produces sensor data that does not reflect the accurate position of the eye portion, etc.

At block 408, the method 400 (subsequent to the condition no longer being detected) updates the eye tracking data using a smoothed 3D position of the portion of the eye. The smoothed 3D position may be determined based on one or more previously-tracked 3D positions of the portion of the eye. (e.g., using the last tracked 3D position). Likewise, the eye tracking data may be updated using the one or more previously-tracked 3D positions of the portion of the eye. (e.g., using the last tracked 3D position). In some implementations, the smoothed 3D position may be configured to gradually reach the current 3D position at a rate determined based on a confidence level of the current 3D position. The confidence level may be dependent on a position of the portion of the eye with respect to the 3D region. For example, a confidence level may increase when the pupils of a user are detected to point towards a center of the 3D region (e.g., an eye box). Likewise, the confidence level may be configured to decrease as a function of an angular distance associated with a detected gaze direction of the eye. In some implementations, a hysteresis may be applied based on a threshold angular distance associated with the angular distance.

Figure 5:
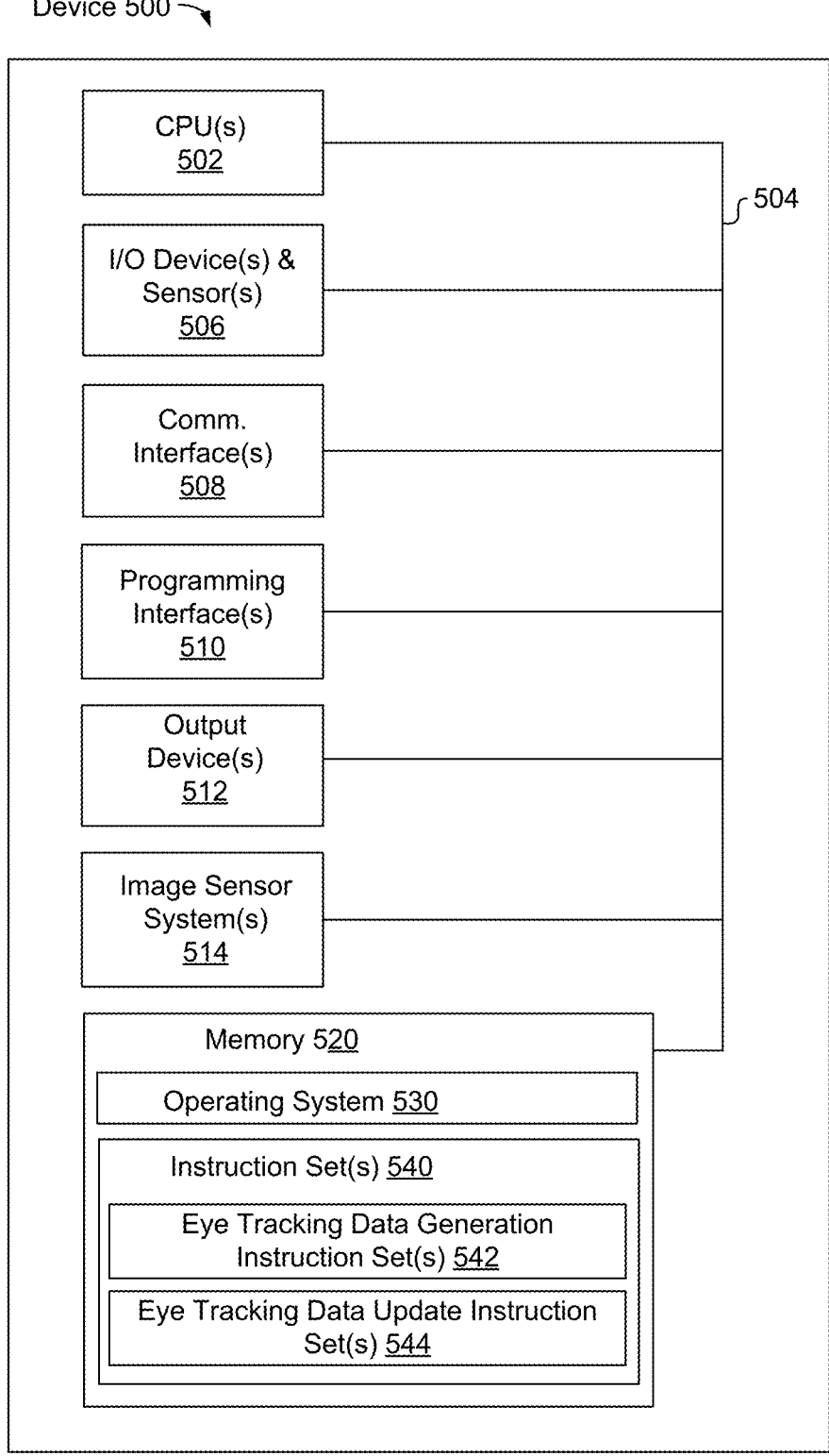
FIG. 5 is a block diagram of an electronic device of in accordance with some implementations.

FIG. 5 is a block diagram of an example device 500. Device 500 illustrates an exemplary device configuration for electronic device of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units 502 (e.g., microprocessors, ASICs, FPGAs, GPUs, CPUs, processing cores, and/or the like), one or more input/output (I/O) devices and sensors 504, one or more communication interfaces 508 (e.g., USB, FIREWIRE, THUNDERBOLT, IEEE 802.3x, IEEE 802.11x, IEEE 802.14x, GSM, CDMA, TDMA, GPS, IR, BLUETOOTH, ZIGBEE, SPI, I2C, and/or the like type interface), one or more programming (e.g., I/O) interfaces 510, output devices (e.g., one or more displays) 512, one or more interior and/or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 505 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras (e.g., inward facing cameras and outward facing cameras of an HMD), one or more infrared sensors, one or more heat map sensors, and/or the like.

In some implementations, the one or more displays 512 are configured to present a view of a physical environment, a graphical environment, an extended reality environment, etc. to the user. In some implementations, the one or more displays 512 are configured to present content (determined based on a determined user/object location of the user within the physical environment) to the user. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 512 correspond to diffractive, reflective, polarized, holographic, etc. waveguide displays. In one example, the device 500 includes a single display. In another example, the device 500 includes a display for each eye of the user.

In some implementations, the one or more image sensor systems 514 are configured to obtain image data that corresponds to at least a portion of the physical environment 100. For example, the one or more image sensor systems 514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 514 further include illumination sources that emit light, such as a flash. In various implementations, the one or more image sensor systems 514 further include an on-camera image signal processor (ISP) configured to execute a plurality of processing operations on the image data.

In some implementations, sensor data may be obtained by device(s) (e.g., device 10 of FIG. 1) during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, IMU, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room).

In some implementations, sensor data may be positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment.

Movements of any of the points in the point cloud are accurately tracked over time, so that the SLAM system can maintain precise understanding of its location and orientation as it travels through an environment, using the points in the point cloud as reference points for the location.

In some implementations, the device 500 includes an eye tracking system for detecting eye position and eye movements (e.g., eye tracking). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 500 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 500.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 includes a non-transitory computer readable storage medium.

In some implementations, the memory 520 or the non-transitory computer readable storage medium of the memory 520 stores an optional operating system 530 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein.

The instruction set(s) 540 includes an eye tracking data generation instruction set 542 and an eye tracking data update instruction set 544. The instruction set(s) 540 may be embodied as a single software executable or multiple software executables.

The eye tracking data generation instruction set 542 is configured with instructions executable by a processor to obtain sensor data (e.g., from HMD cameras) and generate eye tracking data comprising a 3D position of a portion of an eye based on tracking the 3D position of the portion of the eye.

The eye tracking data updating instruction set 544 is configured with instructions executable by a processor to update the eye tracking data using a smoothed 3D position of the portion of the eye.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a head mounted device (HMD) having a processor, a sensor, and a display:
capturing sensor data of a 3D region via the sensor, wherein the 3D region is in front of the display of the HMD that an eye of a user is expected to occupy while the HMD is worn by the user;
generating eye tracking data comprising a 3D position of a portion of an eye based on tracking the 3D position of the portion of the eye, wherein the 3D position is updated over time based on the captured sensor data;

detecting a condition interfering with updating the 3D position of the portion of the eye based on the captured sensor data; and
following the condition, updating the eye tracking data using a smoothed 3D position of the portion of the eye, the smoothed 3D position determined based on one or more previously-tracked 3D positions of the portion of the eye and a current 3D position of the portion of the eye determined based on current sensor data, wherein the smoothed 3D position gradually reaches the current 3D position at a rate determined based on a confidence level of the current 3D position, and wherein the confidence level is configured to decrease as a function of an angular distance associated with a gaze direction of the eye.

2. The method of claim 1, further comprising during the condition, updating the eye tracking data using the one or more previously-tracked 3D positions of the portion of the eye.

3. The method of claim 1, wherein the confidence level is dependent on a position of the portion of the eye with respect to the 3D region.

4. The method of claim 1, further comprising applying a hysteresis based on a threshold angular distance associated with the angular distance.

5. The method of claim 1, wherein the portion of the eye is a pupil.

6. The method of claim 1, wherein the condition is a blinking motion associated with the eye or a rapid motion associated with movement of the eye.

7. The method of claim 1, wherein the sensor data is generated based on an IR glint pattern reflecting off of a surface of the eye, and wherein the sensor captures images of the IR glint pattern.

8. The method of claim 7, wherein determining the 3D position of the portion of the eye is based on the IR glint pattern captured in the images.

9. A head mounted device (HMD) comprising:
a non-transitory computer-readable storage medium; and
one or more processors coupled to the non-transitory computer-readable storage medium, wherein the non-transitory computer-readable storage medium comprises program instructions that, when executed on the one or more processors, cause the HMD to perform operations comprising:
capturing sensor data of a 3D region via a sensor of the HMD, wherein the 3D region is in front of a display of the HMD that an eye of a user is expected to occupy while the HMD is worn by the user;
generating eye tracking data comprising a 3D position of a portion pupil of an eye based on tracking the 3D position of the pupil of the eye, wherein the 3D position is updated over time based on the captured sensor data;
detecting a condition interfering with updating the 3D position of the portion of the eye based on the captured sensor data;
locking a last known pupil position of one or more previously-tracked 3D positions of pupil coordinates of the pupil of the eye until a current 3D position of pupil coordinates of the pupil of the eye is determined based on current sensor data; and
following the condition and the locking, updating the eye tracking data using a smoothed 3D position of pupil coordinates of the pupil of the eye, the smoothed 3D position determined based on the one or more previously-tracked 3D positions of pupil coordinates of the pupil of the eye and the current 3D position of pupil coordinates of the pupil of the eye.

10. The HMD of claim 9, wherein the program instructions, when executed on the one or more processors, further cause the HMD to perform operations comprising:

during the condition, updating the eye tracking data using the one or more previously-tracked 3D positions of pupil coordinates of the pupil of the eye.

11. The HMD of claim 9, wherein the smoothed 3D position gradually reaches the current 3D position at a rate determined based on a confidence level of the current 3D position.

12. The HMD of claim 11, wherein the confidence level is dependent on a position of the pupil of the eye with respect to the 3D region.

13. The HMD of claim 11, wherein the confidence level is configured to decrease as a function of an angular distance associated with a gaze direction of the eye.

14. The HMD of claim 13, wherein the program instructions, when executed on the one or more processors, further cause the HMD to perform operations comprising:

applying a hysteresis based on a threshold angular distance associated with the angular distance.

15. The HMD of claim 9, wherein the condition is a blinking motion associated with the eye or a rapid motion associated with movement of the eye.

16. The HMD of claim 9, wherein the sensor data is generated based on an IR glint pattern reflecting off of a surface of the eye, and wherein the sensor captures images of the IR glint pattern.

17. The HMD of claim 9, further comprising:

adjusting a display of the HMD based on the smoothed 3D position.

18. The HMD of claim 17, wherein the display is adjusted to compensate for lens distortion, chromatic aberration, or foveation.

19. A non-transitory computer-readable storage medium storing program instructions executable via one or more processors, of a head mounted device (HMD), to perform operations comprising:

capturing sensor data of a 3D region via a sensor, wherein the 3D region is in front of a display of the HMD that an eye of a user is expected to occupy while the HMD is worn by the user;

generating eye tracking data comprising a 3D position of a pupil of an eye based on tracking the 3D position of the pupil of the eye, wherein the 3D position is updated over time based on the captured sensor data;

detecting a condition interfering with updating the 3D position of the portion of the eye based on the captured sensor data;

locking a last known pupil position of one or more previously-tracked 3D positions of pupil coordinates of the pupil of the eye until a current 3D position of pupil coordinates of the pupil of the eye is determined based on current sensor data; and following the condition and the locking, updating the eye tracking data using a smoothed 3D position of pupil coordinates of the pupil of the eye, the smoothed 3D position determined based on the one or more previously-tracked 3D positions of pupil coordinates of the pupil of the eye and the current 3D position of pupil coordinates of the pupil of the eye.

* * * * *